(12) United States Patent
Elsperger et al.

(10) Patent No.: US 11,377,311 B2
(45) Date of Patent: Jul. 5, 2022

(54) DEVICE FOR SUPPORTING TRANSPORT ELEMENTS ON LINEAR MOTORS

(71) Applicant: KRONES AG, Neutraubling (DE)

(72) Inventors: Stefan Elsperger, Soechtenau (DE); Michael Neubauer, Grassau (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/252,240

(22) PCT Filed: Mar. 7, 2019

(86) PCT No.: PCT/EP2019/055665
§ 371 (c)(1),
(2) Date: Dec. 14, 2020

(87) PCT Pub. No.: WO2019/238280
PCT Pub. Date: Dec. 19, 2019

(65) Prior Publication Data
US 2021/0253374 A1    Aug. 19, 2021

(30) Foreign Application Priority Data
Jun. 15, 2018   (DE) .................. 10 2018 209 722.4

(51) Int. Cl.
*B65G 54/02*   (2006.01)
*H02K 41/03*   (2006.01)

(52) U.S. Cl.
CPC ......... *B65G 54/025* (2013.01); *H02K 41/031* (2013.01)

(58) Field of Classification Search
CPC ..... B65G 54/02; B65G 54/025; H02K 41/031
See application file for complete search history.

(56) References Cited

U.S. PATENT DOCUMENTS 9,802,507 B2 * 10/2017 Clark ..................... B60L 13/03
10,569,974 B2 * 2/2020 Neubauer ............. B65G 54/02
(Continued)

FOREIGN PATENT DOCUMENTS

DE    102010028055 A1    10/2011
DE    102015226139 A1    6/2017
(Continued)

OTHER PUBLICATIONS

ISA European Patent Office, International Search Report Issued in Application No. PCT/EP2019/055665, dated Jun. 18, 2019, WIPO, 5 pages.
(Continued)

*Primary Examiner* — William R Harp
(74) *Attorney, Agent, or Firm* — McCoy Russell LLP

(57) ABSTRACT

The present invention provides a container treatment system with a transport system for transporting containers along a transport conveyor the transport system comprising a plurality of transport elements movably supported on one side on at least one first guide element, and a long-stator linear motor drive arranged on the side of the first guide element, wherein a bearing of the transport elements on the first guide element is formed in such a way, in that the transport elements are held essentially by magnetic interaction on the first guide element, and wherein at least one second guide element is provided in sections along the transport conveyor, which is adapted in such a way that the transport elements are held on the first guide element by a mechanical engagement with the second guide element.

18 Claims, 6 Drawing Sheets

(56) References Cited

U.S. PATENT DOCUMENTS

| | | | |
|---|---|---|---|
| 10,759,613 B2* | 9/2020 | Neubauer | H02K 41/031 |
| 10,826,370 B2* | 11/2020 | Huber | H02P 25/06 |
| 10,894,675 B2* | 1/2021 | Hartung | B65G 54/02 |
| 10,913,362 B2* | 2/2021 | Holzleitner | H02P 6/006 |
| 10,923,997 B2* | 2/2021 | Hoeck | B60L 13/03 |
| 10,974,914 B2* | 4/2021 | Kleinikkink | B65G 35/08 |
| 11,117,758 B2* | 9/2021 | Kleinikkink | H02K 41/00 |
| 2013/0026005 A1 | 1/2013 | Senn | |
| 2015/0083018 A1 | 3/2015 | Clark et al. | |

FOREIGN PATENT DOCUMENTS

| | | |
|---|---|---|
| DE | 102015226141 A1 | 6/2017 |
| DE | 102014110714 B4 | 2/2018 |
| WO | 2015036194 A1 | 3/2015 |
| WO | 2018161160 A1 | 9/2018 |

OTHER PUBLICATIONS

China National Intellectual Property Administration, Office Action and Search Report Issued in Application No. 201980040125.8, dated Nov. 3, 2015, 8 pages.

* cited by examiner

DEVICE FOR SUPPORTING TRANSPORT ELEMENTS ON LINEAR MOTORS

CROSS REFERENCE TO RELATED APPLICATIONS

The present application is a U.S. National Phase of International Application No. PCT/EP2019/055665 entitled "DEVICE FOR SUPPORTING TRANSPORT ELEMENTS ON LINEAR MOTORS," and filed on Mar. 7, 2019. International Application No. PCT/EP2019/055665 claims priority to German Patent Application No. 10 2018 209 722.4 filed on Jun. 15, 2018. The entire contents of each of the above-listed applications are hereby incorporated by reference for all purposes.

TECHNICAL FIELD

The present invention refers to a device for supporting individually movable transport elements on linear motors, in particular when transporting containers in a container treatment system.

BACKGROUND AND SUMMARY

Transport systems with linear motor drive are well known in the state of the art. The transport systems with linear motor drive have in common that specially formed transport elements, so-called runners, movers, carriages or pucks, are moved along a transport conveyor, especially along one or more guide rails, with the long-stator(s) of one or a plurality of linear motors. The transport elements transport, for example, containers in a container treatment system along the transport conveyor.

The configurations of the transport systems, and especially the transport elements, can be roughly divided into two categories. Transport elements with forced support are mounted positively on the guide rail(s) by means of track rollers and/or other elements. They can therefore only move with one degree of freedom, i.e. along the guide rails. In contrast to this, transport elements with magnetic support are held on the guide rail(s) mainly by magnetic attraction forces, mostly between a secondary part of the transport element and the iron core of the long-stator.

An exemplary configuration, as known in the state of the art, is shown in FIG. 1. The transport element 100 shown here has magnets on both sides of its secondary part 110, which interact with the electrical windings of the long-stator 150. Due to the arrangement of a long-stator 150 only on one side of the transport element 100, the transport element is held by magnetic attraction between the magnets of the secondary part 110 and the long-stator 150, in particular an iron core of the long-stator not shown, on the guide rails 160 arranged on one side. The exemplary shown transport element 100 is movably supported by track rollers 106a and guide rollers 105a on one side of guide rails 160 of the long-stator linear motor. In the further development shown here, the transport element 100 also has track rollers 106b and guide rollers 105b on the side opposite the guide rails 160 in order to be guided on opposite guide rails in the branching area of a switch. Correspondingly, the secondary part 110 can also have magnets or poles of magnets on both sides. Alternatively, a secondary part equipped with magnets on one side can be provided on both sides of the transport element. In this way, a magnetic interaction with a long-stator arranged on the opposite side can take place, especially in the branching area of a switch.

Here and in the following, a track roller is understood to be a bearing roller, i.e. a roller whose axis of rotation is inclined or perpendicular to the movement plane of the transport element 100 spanned by the two guide rails 160. The track rollers of the transport element are thus used, among other things, to absorb the weight force, which consists of the mass of the transport element 100 and an unfilled or filled container. In contrast to this, a guide roller is a bearing roller whose axis of rotation lies in the movement plane and which therefore serves exclusively to guide and absorb the magnetic attraction force, but not to absorb a load which is created by the weight force. Apart from the friction occurring between the track rollers 106a and 106b and the guide rails 160, the transport element can be easily removed from the guide rails 160 perpendicular to the movement plane, for example for maintenance purposes. Only the magnetic attraction between transport element 100, more precisely the secondary part 110, and the long-stator linear motor 150 holds the transport element to the guide rails 150.

However, if a higher load of the transport element occurs, for example when cornering at high speed, the magnetic attraction available may not be sufficient to hold the transport element on the guide rails 160. In this case the transport element can be lifted completely or partially off the guide rails and in the worst case fall out of the guide. A similar problem can occur if, for example, a container transported by the gripper element 115 is too heavy so that a torque acting on the transport element 100 lifts the bearing rollers 105a and 106a off the upper guide rail 160.

The present invention is thus based on the object of providing a device for supporting transport elements on linear motors in container treatment systems, which allows safe guidance of the transport elements even under increased load.

The above-mentioned objects are solved by a container treatment system, in particular a filling plant, with a transport system for transporting containers along a transport conveyor, wherein the transport system comprises a plurality of transport elements movably supported on one side on at least one first guide element and a long-stator linear motor drive arranged on the side of the first guide element, wherein a bearing of the transport elements on the first guide element is adapted in such a way, that the transport elements are held on the first guide element essentially by magnetic interaction, in particular with the long-stator linear motor drive, and at least one second guide element being provided in sections along the transport conveyor, which is adapted in such a way that the transport elements are held on the first guide element by mechanical engagement with the second guide element.

Container treatment systems are well known in the state of the art and are therefore not described in detail here. Well-known examples of container treatment systems or their components include a blow molding machine for blow molding preforms, a filling plant, a labeler, a printing machine, a capper, an inspection device and combinations of these components. Within the container treatment system, the containers, for example glass or plastic bottles, cans or the like, are transported from one container treatment unit to the next by means of one or a plurality of transport systems. According to the invention, the container treatment system has a transport system for transporting containers along a transport conveyor with a long-stator linear motor drive.

For this purpose, a plurality of transport elements is movably supported on at least one first guide element, the at least one first guide element being provided only on one side of the transport elements according to the present further development. The side is defined with respect to the movement plane described above in connection with FIG. 1. In addition, a long-stator linear motor drive is arranged on the same side as the first guide element, by means of which, via magnetic interaction with the secondary parts of the transport elements, an individual movement of the transport elements is effected according to individual path-time profiles along the transport conveyor via targeted control of the electrical windings or coils of the long-stator.

Long-stator linear motors are well known in the state of the art, so that a detailed description can be dispensed with. The linear motor train of the linear motor is formed as a long-stator, wherein synchronous or asynchronous linear motors can be used. The secondary parts of the transport elements can have at least one permanent magnet and/or non-switching electromagnet for magnetic interaction with the linear motor train arranged on one side.

According to the present invention, the transport elements are mechanically supported on at least one first guide element in such a way that they can be moved along the first guide element by the magnetic interaction with the long-stator linear motor drive. The first guide element can be adapted, for example, as a guide rail, wherein the transport elements have one or a plurality of bearing rollers, plain bearings, roller bearings or the like with which they are mounted on the guide rail(s). It can be advantageous to form this bearing arrangement in such a way that the transport elements are essentially held on the first guide element by magnetic interaction. This is to be understood in such a way that when the magnetic attraction between the transport elements, especially their secondary parts, and corresponding elements of the transport conveyor, especially the long-stator linear motor drive, is overcome, it is possible to lift the transport elements off the first guide element(s). In other words, when the magnetic attraction is overcome, the transport elements have, in addition to the degree of freedom of movement along the first guide element, the degree of freedom of movement perpendicular to the movement plane described above.

This has the advantage, for example, that the transport elements can be easily removed by an operator from the transport system, more precisely the first guide element, for maintenance purposes. Likewise, if the transport elements are essentially held magnetically on the first guide element, a switch of the transport system can be easily realized.

In order to counteract the undesired lifting of the transport elements from the first guide element described above, at least one second guide element is provided in sections along the transport conveyor according to the invention, which holds the transport elements in mechanical engagement with the first guide element. In other words, in the sections in which at least one second guide element is provided, the transport elements are guided on the first and second guide elements in such a way that they cannot be separated from the first guide element even when the magnetic attraction is overcome. The mechanical engagement of the transport elements with the at least one second guide element thus fixes the transport elements in the movement plane and prevents any movement perpendicular to the movement plane. This fixation is especially independent of a load on the transport elements, for example due to a fast curve travel or the transport of a heavy container.

In accordance with a further development, the transport elements may each have a secondary part with at least one magnet, wherein the secondary parts and the long-stator linear motor may in particular be aligned essentially in a vertical plane, wherein deviations of up to 10° are comprised. In this context, a vertical plane is understood to be a plane to which the direction of gravity is parallel. According to this further development, the magnetic attraction between the secondary part and the long-stator thus acts obliquely or perpendicular to this vertical plane. The alignment of the secondary parts and the long-stator linear motor refers to the alignment of the opposing magnetically interacting surfaces of these elements. An example of a vertical alignment is shown in FIG. 1, wherein the magnetically interacting surface of the secondary part 110 is hatched.

According to a further development, the second guide element can be adapted to prevent a translational movement of the transport element away from the first guide element, especially against a magnetic attraction between the transport element and the long-stator linear motor drive. The arrangement of the second guide element is thus such that it opposes a linear movement of the transport element out of the movement plane by blocking such a movement. It goes without saying that here and in the other further developments there is always a parallel arrangement of the second guide element with respect to the first guide element.

Alternatively or additionally, the second guide element can be adapted to prevent the transport element from rotating around the first guide element. This is to be understood in such a way that the second guide element is arranged in such a way that it counteracts a possible torque acting on the transport element, for example due to the weight of the container being transported. This means that the second guide element can also prevent the transport element from partially lifting off the first guide element.

The second guide element may comprise a guide curve and/or a guide rail, the transport elements comprising at least one bearing element, in particular a roller, a rolling bearing or a plain bearing, which is guided in mechanical engagement with the second guide element. Thus the at least one bearing element rolls, rolls off or slides along the guide curve and/or the guide rail. It is understood that the second guide element can also have combinations of guide curves and guide rails, wherein the transport element can have combinations of the above mentioned bearing elements. The bearing element can also be adapted as a guide block or guide clamp. In this case, a guide block or a guide clamp encompasses the second guide element, i.e. the guide curve or the guide rail, in such a way that the translational and rotational movements described above are prevented. The guide block or guide clamp slides along the second guide element.

The second guide element may alternatively or additionally comprise a guide groove and/or a guide channel, the transport elements having at least one bearing element, in particular a guide pin, a guide roller and/or a plain bearing, which is guided in mechanical engagement with the second guide element. Here the guide pin and/or the plain bearing moved in the guide groove or the guide channel fixes the position of the transport element in the movement plane by mechanical contact. Again, it is obvious that the guide groove or guide channel is arranged parallel to the first guide element.

According to the invention, the second guide element is not arranged continuously along the first guide element or along the transport conveyor, but only in certain sections of the transport conveyor. In particular, the second guide element can be provided exclusively in areas where an increased load of the bearing of the transport elements on the first guide element occurs. As described above, such an increased load can, without providing the second guide element, lead to the transport element being at least partially lifted off the first guide element due to a translational and/or rotational movement. By providing the second guide element in areas where an increased load acts on the bearing of the transport elements on the first guide element, the transport element can be held safely on the first guide element, whereby this holding can handle even heavy loads.

For example, the second guide element can be provided along at least one curved section of the transport conveyor, in particular with a radius of curvature smaller than a threshold. When travelling along a curved section of the transport conveyor, centrifugal forces occur, which can overcome the magnetic attraction as from a certain speed. If the usual operating speed is predefined, the mentioned specific speed corresponds to a threshold of the radius of curvature of the corresponding curved section, whereby the total mass of the moving transport element including the transported container must be considered. Thus a threshold of the radius of curvature can be defined, so that for curve sections below this radius of curvature a second guide element can be provided to guide the transport elements safely along the curve.

The second guide element can be provided at a transfer point and/or a take-over point of the container treatment system for containers. At a transfer point, the container conveyed by the transport element is transferred to a container treatment unit or a further transport system, for example a transfer star. Accordingly, at a transfer point a container is taken over by a container treatment unit or a further transport system. For this purpose, the transport elements can have suitable gripping elements, such as a passive neck-handling clamp, by means of which the transported containers are held. As shear and/or tensile forces generally occur during transfer or take-over, the arrangement of the second guide element in the area of the transfer or take-over is useful to avoid lifting of the transport elements from the first guide element due to the shear and/or tensile forces occurring. For example, pressing the container into a passive neck-handling clamp or pulling the container out of the passive neck-handling clamp leads to a force acting perpendicular to the movement plane, which could possibly overcome the magnetic attraction. By providing the second guide element in the area of the transfer or take-over, i.e. for example starting at least 10 cm in front of the transfer or take-over point and ending at the earliest 10 cm after the transfer or take-over point, the transport elements can be held safely in the movement plane despite the forces that occur.

The second guide element can alternatively or additionally be provided at a switch of the transport system on the side opposite to the first guide element, wherein in particular a further long-stator linear motor drive is provided on the side of the second guide element. In accordance with this further development, the transport elements are thus guided in a partial area of the switch, for example in the inlet to the branching point, by the first guide element(s) and the second guide element(s) on both sides, whereby a second long-stator linear motor drive can be provided opposite the previously mentioned long-stator linear motor drive for the switch travel. Also behind the branching point, at least one first and at least one second guide element can be provided for each branched side conveyor to guide the transport elements on both sides. As in the case of a curve drive, the unavoidable curvature of the transport conveyor causes a centrifugal force to occur at least in some areas of the switch also in the case of a switch drive, wherein the second guide element can be used to build up a counterforce up to the actual branching area, which keeps the transport elements in the respective movement plane.

The second guide element can be located in particular on the side opposite the first guide element. Thus, the transport element is located between the first and the second guide element so that it can be guided stably on both sides.

Alternatively or additionally the second guide element can be arranged above and/or below the first guide element. The second guide element can also be arranged diagonally offset upwards or downwards in relation to the first guide element. A second guide element arranged in this way can, in particular, have a guide channel and/or a guide groove as mentioned above. A guide roller of the transport element can also be guided in a guide channel.

Alternatively or additionally, the second guide element can be arranged on the side of the first guide element. On the side of the first guide element is to be understood in such a way that the entire half-space starting from the center plane of the transport element is included, which includes the first guide element. An additional guide element on the side of the first guide element can, for example, be in mechanical engagement with a corresponding bearing roller of the transport element, the bearing roller and the second guide element being arranged in such a way that the translational and/or rotational movement of the transport element described above would exert a force on the second guide element.

Finally, the second guide element can be provided in an area of a filling of the containers, since in this area the load carried by the transport elements changes considerably. Especially the forces on the bearing of the transport elements caused by pressure filling can be compensated, so that the transport elements can be guided safely along the transport conveyor.

It goes without saying that the present invention also comprises combinations of the further developments described above, whereby a plurality of second guide elements, also of different kinds, may be provided. Likewise, second guide elements, in particular different ones, may be provided at different locations along the transport conveyor, as long as they are not provided continuously along the first guide element. The second guide element(s) therefore only act as a support, without taking over the task of a general guide element of the transport system along the transport conveyor. At the branching point of a switch, the second guide element may be interrupted in order to allow guiding of the transport elements in each of the two branching directions. However, a second guide element provided on the opposite side can continuously follow the diverging course of one branching direction while the first guide element follows the course of the first branching direction.

A variety of other configurations of the first and second guide elements is conceivable as long as the second guide element holds the transport element safely to the first guide element by mechanical engagement with corresponding bearing elements of the transport element, while the free movement of the transport element along the transport conveyor is maintained.

BRIEF DESCRIPTION OF THE FIGURES

Further features and exemplary embodiments as well as advantages of the present invention will be explained in more detail below on the basis of the drawings. It is understood that the embodiments do not exhaust the scope of the present invention. It is also understood that some or all of the features described below can also be combined in other ways.

DETAILED DESCRIPTION

Figure 1:
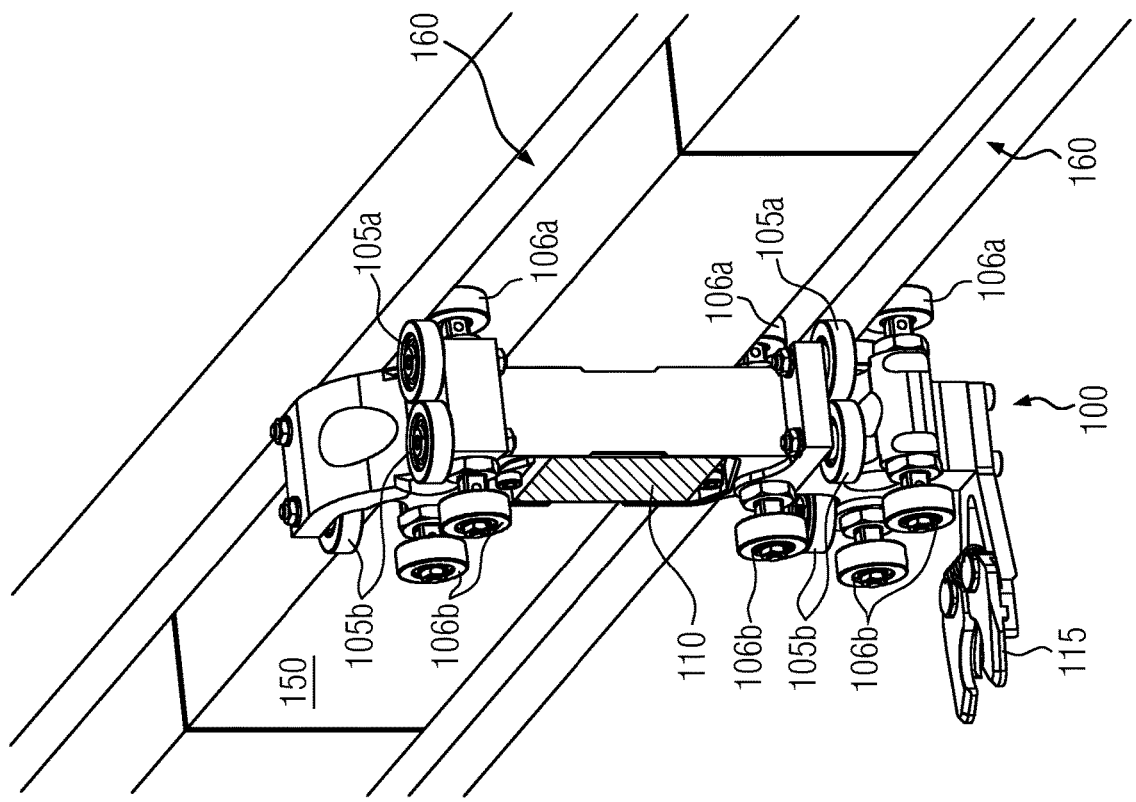
FIG. 1 shows a schematic representation of a single-sided guided transport element according to the state of the art.

In the Figures described below, identical reference numerals denote identical elements. For better clarity, identical elements are described only when they first appear. However, it is understood that the variants and embodiments of an element described with reference to one of the Figures can also be applied to the corresponding elements in the other Figures.

Figure 2:
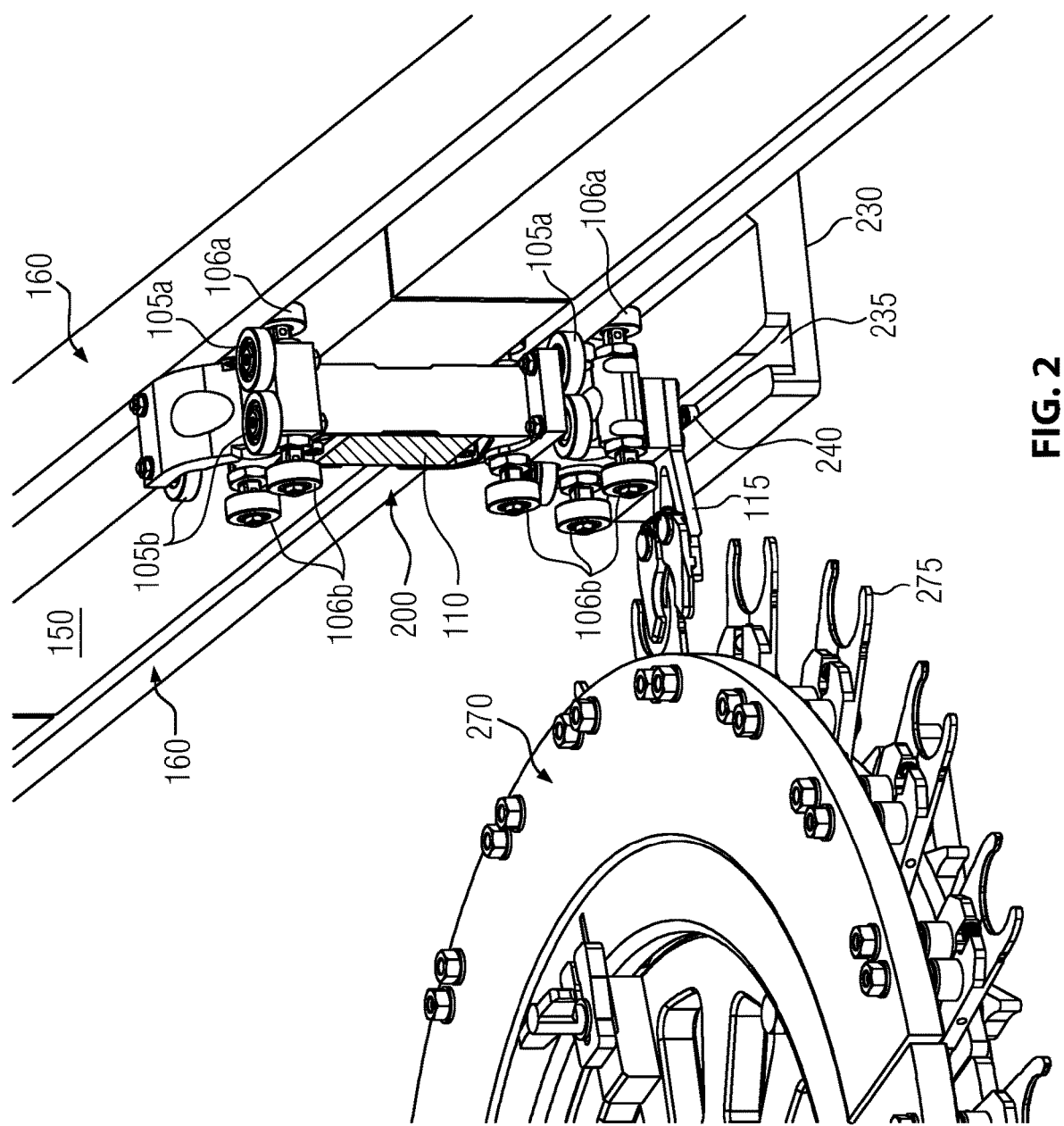
FIG. 2 schematically shows the provision of a second guide element, formed with a guide channel, in a transfer area for containers according to a first further embodiment of the present invention.

FIG. 2 schematically shows the provision of a second guide element, formed with a guide channel, in a transfer area for containers according to a first further development of the present invention. In the further development shown, for example, containers (not shown) are transferred from holding devices 275 of a transfer star 270 to a gripping element 115, for example a passive neck-handling clamp, of the transport element 200 or are taken over by it. As described above, a force perpendicular to the movement plane of the transport element 200 may occur which could lift the transport element at least partially off the guide rails 160.

As in the state of the art as shown in FIG. 1, also according to the further development shown in FIG. 2, the transport element 200 is supported on one side on guide rails 160, which thus represent the at least first guide element, wherein a long-stator linear motor 150 is provided for the individually controlled movement of the transport element 200 along the guide rails 160. The support of the transport element on the guide rails 160 is effected according to the non-limiting further development shown in FIG. 2 via guide rollers 105a as well as track rollers 106a. Again, corresponding guide rollers 105b and track rollers 106b are provided on the side of the transport element 200 opposite the guide rails 160, by means of which the transport element 200 can be guided in the direction of a diverging side conveyor, for example, in a switch area on corresponding guide rails provided opposite. For this purpose, the exemplary transport element 200 also has magnets or magnetic poles on both sides of the secondary part 110 or one secondary part 110 on both sides of the transport element 200, each of which is equipped with at least one magnet which is indicated by hatching in FIG. 2. It is understood, however, that the symmetrical further development of the transport element 200 is not absolutely necessary, especially if no switches are provided, and therefore track rollers and guide rollers and magnets arranged on one side of the guide rails 160 may be sufficient.

According to the first further embodiment of the present invention, a second guide element 230 with a guide channel 235 is provided in the area of the transfer, in which an appropriately adapted bearing element 240, for example a guide pin or guide roller, can be guided. If a force perpendicular to the movement plane occurs due to the transfer of a container, this force is compensated by mechanical engagement of the bearing element 240 with the guide channel 235. In this way, the second guide element 230 prevents by mechanical engagement of the transport element, more precisely the bearing element 240, with the second guide element 230, more precisely the guide channel 235, that the lower track rollers 106a and guide rollers 105 of the transport element 200 are lifted from the lower guide rail 160 by a rotational movement. The arrangement of the second guide element 230 below the first guide element 160 is particularly effective in compensating a torque acting on the transport element 200.

Figure 3:
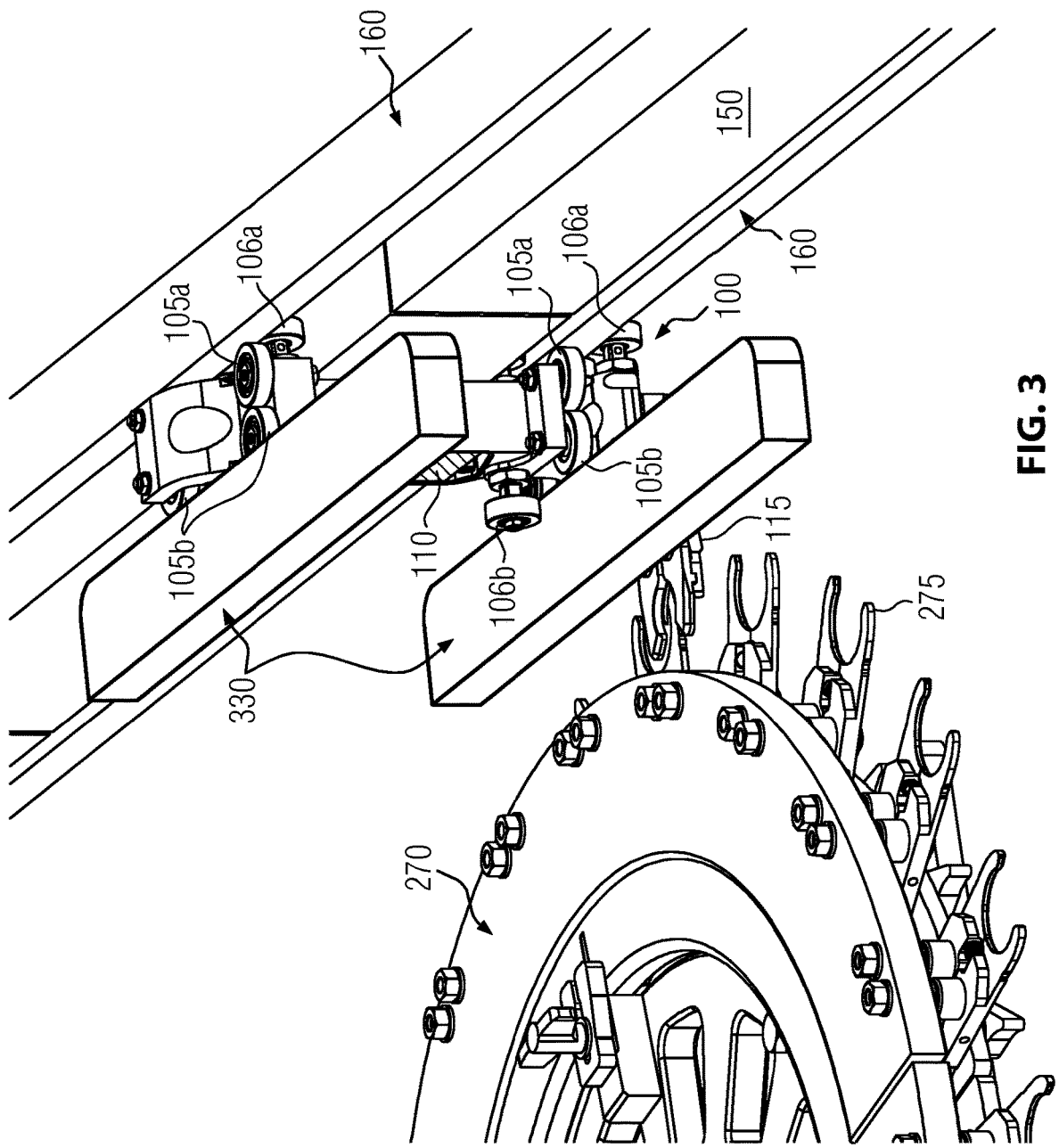
FIG. 3 shows guide rails arranged on the opposite side as second guide elements according to a second further development of the present invention.

FIG. 3 shows a variation of the further development of FIG. 2, wherein the second guide element 230, which is located below the guide rails 160, has been replaced by two guide rails 330, which are located opposite the guide rails 160. In order to compensate for the torque mentioned above, it would also be sufficient to provide only the lower guide rail 330. The provision of two guide rails 330 opposite the guide rails 160 in sections leads to a stable guidance of the transport element 100 along this section of the transport conveyor. In the non-limiting further development shown, both the track rollers 106b and the guide rollers 105b of the transport element 100 on the opposite side, i.e. the side opposite the guide rails 160 with respect to the movement plane of the transport element, come into mechanical engagement with the second guide elements 330.

Figure 4:
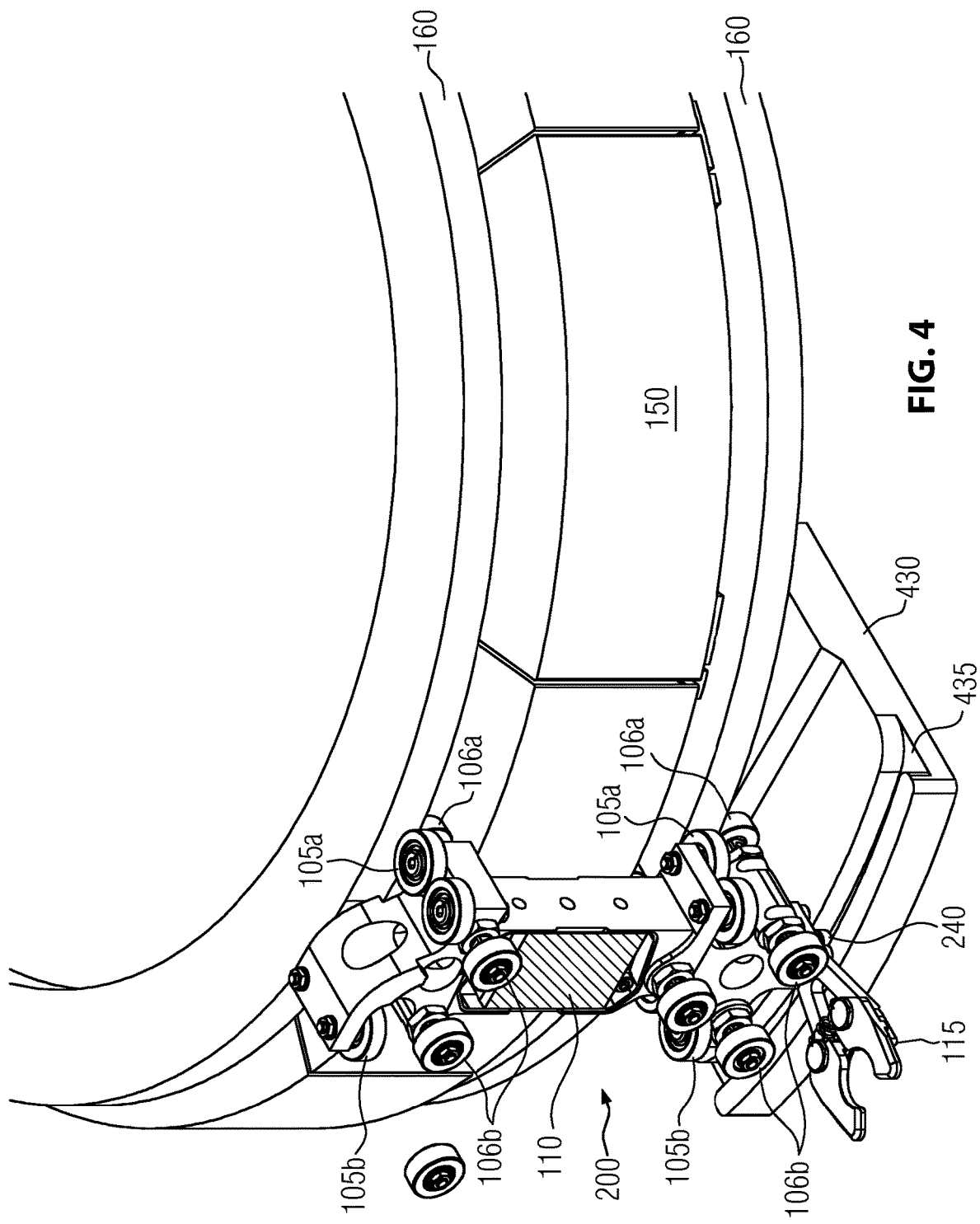
FIG. 4 shows a second guide element formed with a curved guide channel for curved travel of a transport element according to the present invention.

FIG. 4 shows an example of a curved section of the transport conveyor, which has correspondingly curved guide rails 160 and a correspondingly curved long-stator 150. In accordance with the further development of the second guide element of FIG. 2, a second guide element 430 with a curved guide channel 435 is provided along the curved section, in which a corresponding bearing element 240 of the transport element 200 is guided. For reasons of illustration, the guide element 430 is only shown along a segment of the curved section in FIG. 4. It is understood, however, that the second guide element 430 can be provided along the entire curved section in order to compensate for centrifugal forces occurring via the mechanical engagement of the bearing element 240 with the guide channel 435. Alternatively, the second guide element 430 can only be provided at a transfer point of the curved section where a container (not shown) transported by the transport element 200 by means of the gripping element 115 can be transferred to a linear conveyor (not shown).

Figure 5:
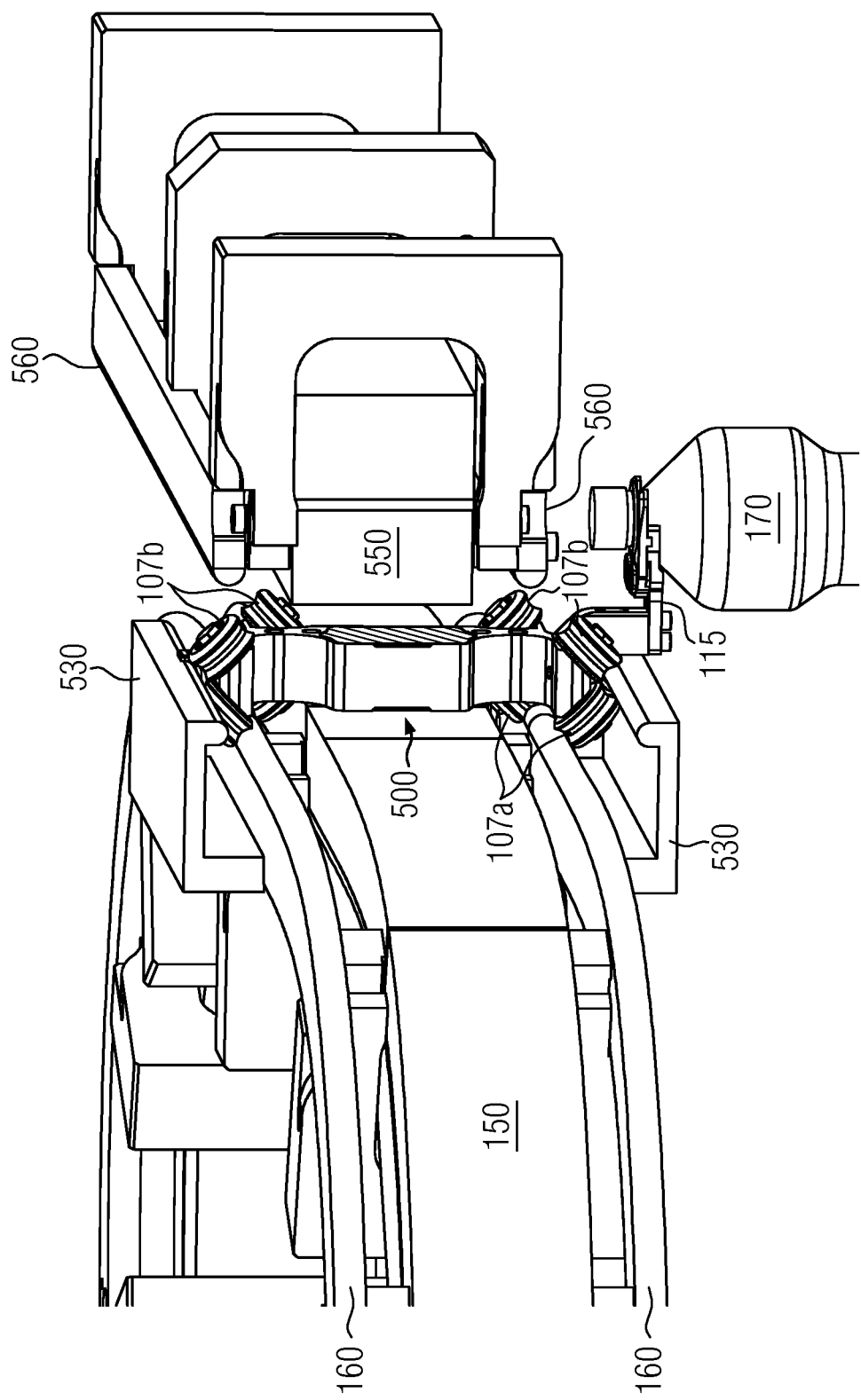
FIG. 5 shows a configuration of the second guide element by means of guide rails arranged on the side of the linear motor according to the present invention.

FIG. 5 shows a further development of a second guide element according to the invention. According to this further development, the transport element 500 has four pairs of guide rollers 107a and 107b arranged at an angle to the movement plane, of which the guide rollers 107a arranged on the side of the long-stator 150 roll off on the previously described guide rails 160. Due to their geometric arrangement and combination, these guide rollers 107a and 107b fulfill the load absorption both by the vertically acting weight force of the transport element 500 and a possible container and the vertically acting force on the long-stator 150 by the magnetic force. According to the further development shown, the second guide element comprises upper and lower guide rails 530 on the side of the long-stator 150, on which some of the guide rollers 107*a* roll-off. The guide rails 530 are arranged in such a way that these guide rollers 107*a* are simultaneously in engagement with a guide rail 160 of the first guide element and a guide rail 530 of the second guide element. Due to the inclined position of the guide rollers 107*a*, the guide rails 530 thus block the lifting of the transport element 500 from the guide rails 160.

In the non-limiting further development shown here, some of the guide rollers 107*b* are also in mechanical engagement with the guide rails 530, which further stabilizes the guiding of the transport element. Thus even heavy containers 170 can be transported safely by the transport element 500.

FIG. 5 shows additional second guide elements 560, which are arranged as guide rails on the opposite side. These guide rails 560 can be used especially in the inlet to a branching area of a switch and can be continued along a section of one of the diverging side conveyors, while the first guide elements 160 are arranged along the second diverging side conveyor. The guide rails 560 also stabilize the transport element 500 in the movement plane by mechanical engagement with the guide rollers 107*b*. The guide rails 530 and the guide rails 560 can be arranged overlapping in the direction of movement or offset along the transport conveyor. In particular, the guide rails 530 can be used to correctly insert the transport element 500 into the branching area of a switch. FIG. 5 additionally shows another long-stator 550, which is located in the branching area of the switch opposite the first long-stator 150.

Figure 6:
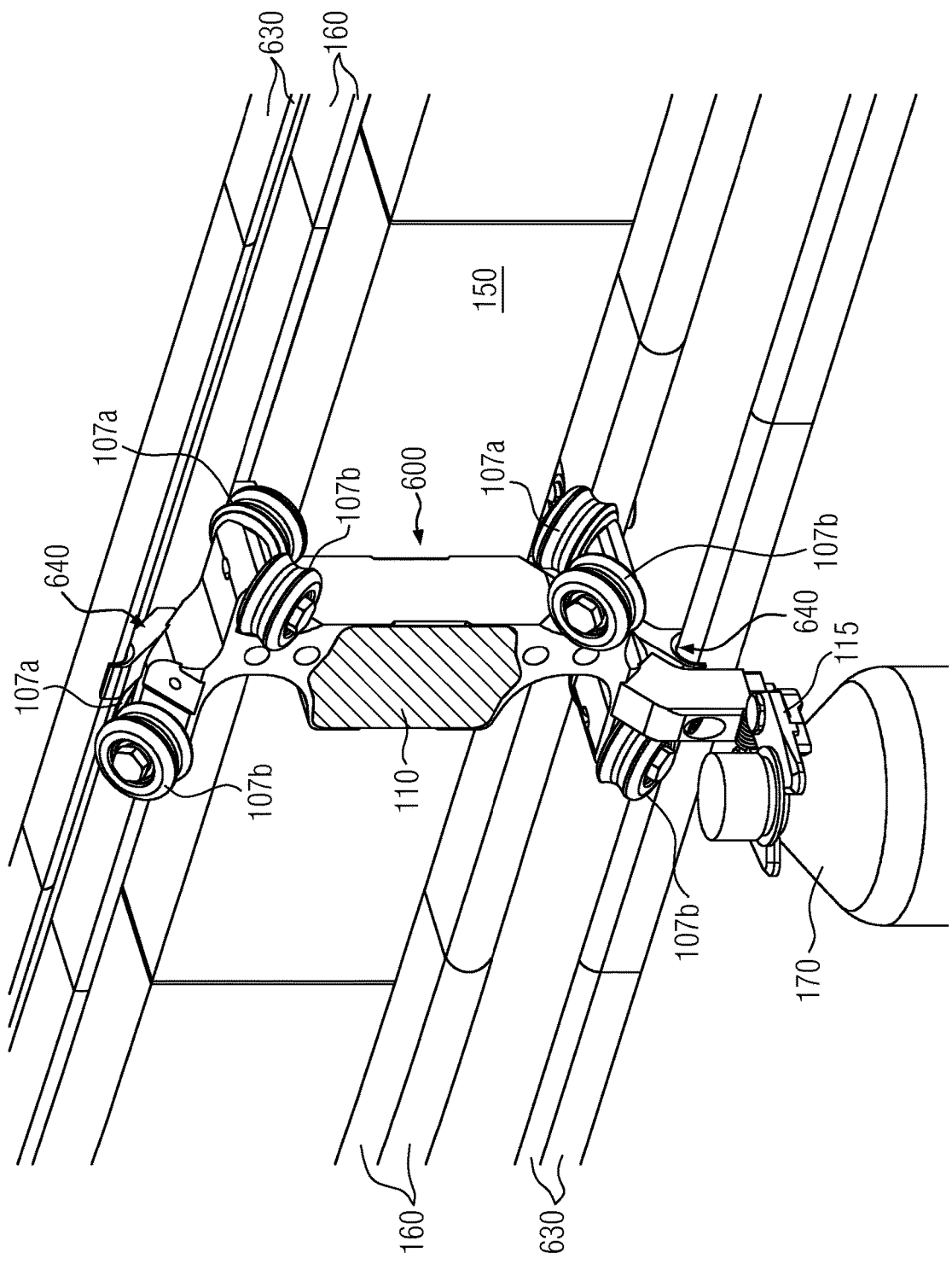
FIG. 6 shows a configuration of the second guide element as a guide rail on the side of the linear motor with a guide block of the transport element.

Finally, FIG. 6 shows a further development of the present invention, in which the second guide element is formed as two additional guide rails 630 on the side of the long-stator 150. In this further development, the transport element 600 has two guide blocks 640, which are formed in such a way that they enclose a part of the respective guide rail 630 and can slide along the guide rail. Due to the arrangement of the guide blocks 640, however, lifting of the transport element 600 from the guide rails 160 is blocked by translation or rotation, so that the transport element 600 can be safely guided on the first guide element 160, regardless of the weight of the container 170 being transported.

The presented further developments support the guiding of a transport element in the movement plane independent of the load acting on the bearings of the transport element. In particular, this can prevent unintentional lifting or even falling-off of a transport element from the lateral guide rails. On the one hand, this increases the process reliability and thus the efficiency of the container treatment system. On the other hand, the limited provision of additional guide elements in areas where an increased load of the bearing on the first guide element occurs is more cost-effective than a continuous guiding on both sides. Furthermore, the section-by-section provision of a second guide element does not impair the elegant further development of switches of a one-sided linear motor system.

The invention claimed is:

1. Container treatment system with a transport system for transporting containers along a transport conveyor, the transport system comprising:
   a plurality of transport elements movably supported on one side on at least one first guide element, and
   a long-stator linear motor arranged on the side of the first guide element,
   wherein a bearing of the transport elements on the first guide element is formed in such a way that the transport elements are held by magnetic interaction, with the long-stator linear motor, on the first guide element,
   wherein
      only in sections along the transport conveyor, at least one second guide element is provided, which is adapted in such a way that the transport elements are held on the first guide element by mechanical engagement with the second guide element, and
      the second guide element is adapted in such a way that the second guide element prevents a translational movement of the transport element away from the first guide element, against the magnetic attraction between the transport element and the long-stator linear motor.

2. The container treatment system according to claim 1, wherein the transport elements each comprise at least one secondary part with at least one magnet, and wherein the secondary parts and the long-stator linear motor are in particular aligned substantially in a vertical plane.

3. The container treatment system according to claim 2, wherein the second guide element is provided for preventing the lifting of the transport elements, in areas of the transport conveyor in which the forces acting on the transport element during operation are regularly greater than a magnetic attraction force between the long-stator linear motor and the secondary part.

4. The container treatment system according to claim 3, wherein the second guide element is adapted to prevent rotation of the transport element about the first guide element.

5. The container treatment system according to claim 1, wherein the second guide element comprises a guide curve and/or a guide rail, and wherein the transport elements comprise at least one bearing element, which is guided in mechanical engagement with the second guide element.

6. The container treatment system according to claim 5, wherein the bearing element comprises a guide block.

7. The container treatment system according to claim 5, wherein the at least one bearing element is a roller, a roller bearing and/or a plain bearing.

8. The container treatment system according to claim 1, wherein the second guide element comprises a guide groove and/or a guide channel, and wherein the transport elements comprise at least one bearing element, which is guided in mechanical engagement with the second guide element.

9. The container treatment system according to claim 8, wherein the at least one bearing element is a guide pin, a guide roller and/or a plain bearing.

10. The container treatment system according to claim 1, wherein the second guide element is provided exclusively in areas where an increased load on the bearing of the transport elements occurs on the first guide element.

11. The container treatment system according to claim 1, wherein the second guide element is provided along at least one curved section of the transport conveyor, with a radius of curvature smaller than a threshold.

12. The container treatment system according to claim 1, wherein the second guide element is provided at a transfer point and/or at a take-over point of the container treatment system for containers.

13. The container treatment system according to claim 1, wherein the second guide element is provided at a switch of the transport system on the side opposite the first guide element, and wherein a further long-stator linear motor is provided on the side of the second guide element.

14. The container treatment system according to claim 1, wherein the second guide element is arranged on the side opposite the first guide element.

15. The container treatment system according to claim 1, wherein the second guide element is arranged above and/or below the first guide element.

16. The container treatment system according to claim 1, wherein the second guide element is arranged on the side of the first guide element.

17. The container treatment system according to claim 1, wherein the second guide element is provided in an area of a filling of the containers.

18. The container treatment system according to claim 1, wherein the system is a filling plant.

\* \* \* \* \*